March 1, 1960 B. LIPPEL 2,927,258
SYSTEM FOR CONTROLLING AUTOMATIC MACHINE TOOLS
Filed July 27, 1951 2 Sheets-Sheet 1
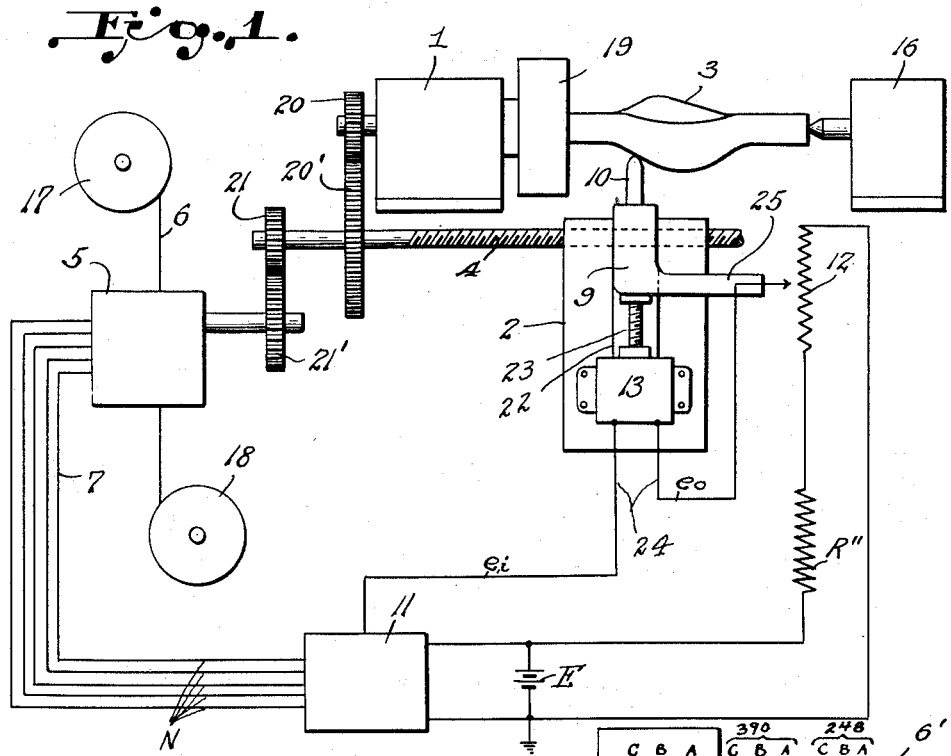
Fig. 1.
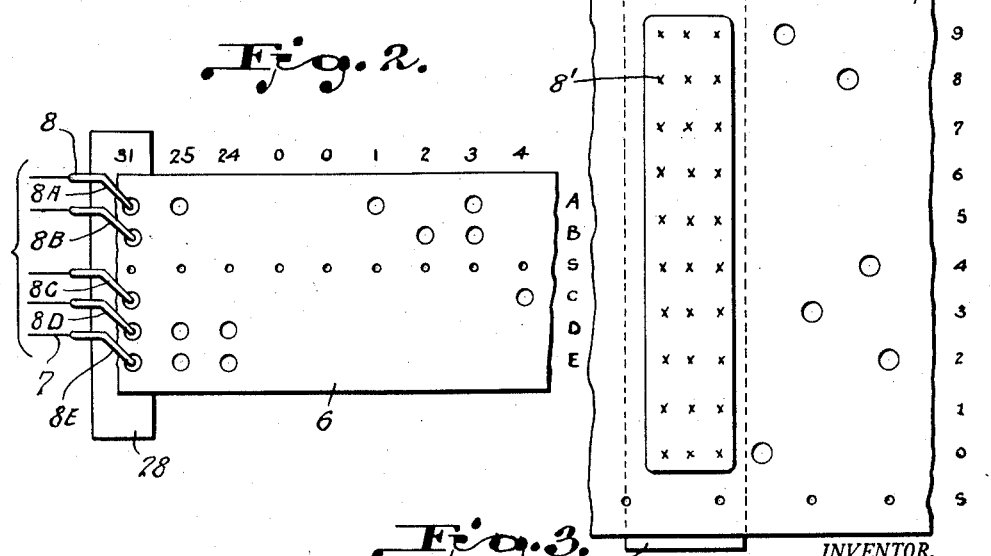
Fig. 2.
Fig. 3.
INVENTOR.
Bernard Lippel
BY
Ralph Burch
ATTORNEY.

March 1, 1960  B. LIPPEL  2,927,258
SYSTEM FOR CONTROLLING AUTOMATIC MACHINE TOOLS
Filed July 27, 1951  2 Sheets-Sheet 2

INVENTOR.
Bernard Lippel
BY
Ralph B Burch
ATTORNEY.

United States Patent Office 2,927,258
Patented Mar. 1, 1960

2,927,258

SYSTEM FOR CONTROLLING AUTOMATIC MACHINE TOOLS

Bernard Lippel, Red Bank, N.J.

Application July 27, 1951, Serial No. 238,896

10 Claims. (Cl. 318—39)

My invention relates to the automatic machining of all kinds of work pieces. It has particular reference to automatically controlling the operation of a machine tool, such as a lathe, milling machine or the like whereby the operation is controlled through the agency of one or more closed-cycle position regulating systems, so that a blank or workpiece is machined exactly in accordance with a desired pattern.

The automatic machine tool considered herein operates from a control data storage member or pattern which contains and transmits to the tool operating means the control data required to produce a workpiece of a particular size and shape. The control data storage member is made optionally removable so that it may be replaced by control data of a different pattern to produce workpieces of various sizes and shapes within the capability of the machine.

A particular feature of my invention lies in the use of digital storage input equipment and digital patterns for control of the machine tool in place of the analog data storages or analog patterns heretofore employed.

The analog data storages of prior systems take the form of models; templates; scale drawings; recordings of electrical signals variable in frequency, amplitude or phase; and the like. To read the stored information, it is necessary for the machine to perform measurements of spatial dimensions; or of the frequency, amplitude or phase of electrical signals; or of some other physical quantities depending upon the exact nature of the storage device. In most prior automatic machine tools, each measured quantity is proportional to a required relative displacement in one dimension between a cutting tool and a point of reference fixed in relation to the workpiece. Some sort of position servo is provided for each dimension which must be automatically controlled and the servo effects the required displacement. Errors in such machines arise from (1) inaccuracies in the analog pattern (2) errors in measurement of the analog pattern (3) errors in the position servo or servos.

Other machine tools have been built or proposed in which the stored control data are proportional to displacements of a tool from its last previous position, instead of from a fixed reference position as described above. It will be evident that with such operation errors are cumulative, so that a local inaccuracy or a temporary malfunction may ruin the entire workpiece.

The digital input equipment and digital patterns used with the present invention make use of a language or code wherein dimensions of the required workpiece are expressed in a digital number system. Advantage is taken of a property of such a language whereby numbers may be written, stored and read with great precision and accuracy, transcending the precision and accuracy of the best analog input equipment and analog patterns. Inaccuracies may therefore be effectively eliminated from the pattern itself and from the reading device which extracts the stored data. Finally, for use when the utmost accuracy is needed, my invention includes a system of servo control, for positioning the cutting tool relative to the work in accordance with digital data extracted from the pattern, which is capable of accuracy exceeding the best servo means operative from analog data.

One object of my invention is to fashion workpieces automatically on a variety of machine tools in a manner which avoids many of the disadvantages and limitations of prior art devices.

Another object of the invention is to fashion workpieces automatically on a variety of machine tools with more precision and greater accuracy than prior devices permit.

Another object of my invention is to fashion workpieces automatically on a variety of machine tools by means of patterns prepared with a minimum of skill and labor.

Still another object of the invention is to fashion workpieces on machine tools by means of signals transmitted over electrical or radio communications facilities.

In accordance with the present invention, a machine tool is controlled automatically to fashion a workpiece to form and dimensions dictated by the numbers stored in a digital storage device or digital pattern. A succession of numbers is stored for each coordinate along which the relative displacement of the tool from a point fixed with respect to the workpiece must be controlled. Means are provided to read control numbers from the storage, with proper synchronism between a plurality of numbers relating to a plurality of coordinates, and in proper relation to motion, if present, along an independently variable coordinate. Finally, servo means are provided to introduce tool displacements in one or more coordinate directions, in accordance with each successive number or set of numbers and with high accuracy.

For a better understanding of the invention together with other and further objects thereof, reference is had to the following description of one possible embodiment and several variations thereof, taken in connection with the accompanying drawings, and the scope of the invention will be pointed out in the appended claims.

In the drawings, Fig. 1 represents one arrangement for automatic operation of a lathe in accordance with my invention.

Fig. 2 shows a form of pattern employing binary number code which may be used with the arrangement of Fig. 1, together with certain elements of the code reading device used therewith.

Fig. 3 shows an alternative pattern employing decimal number code, together with elements of the code reading device used therewith.

Figure 4:
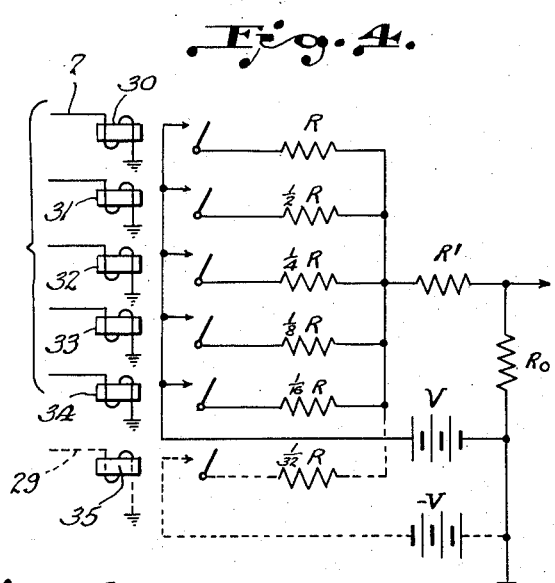
Fig. 4 is a schematic view of an electrical device which can serve as the decoder in the system of Fig. 1.

To explain more clearly my invention, it will be described as embodied in an automatically controlled lathe, which may be considered to be a one-dimensional system, and the manner whereby it is applied to other machine tools, including such as require two and three dimensional control systems, will be obvious to those skilled in the art.

Fig. 1 is a purely diagrammatic drawing intended to show one manner in which a lathe can be controlled from digital data. It will be recognized that the system illustrated therein differs from certain well-known prior systems only in the manner by which the voltage $e_1$ is obtained. In Fig. 1 a drive motor 1 rotates a chuck 19 supporting one end of a workpiece 3 while the opposite end of the workpiece revolves on a dead center supported by a tailstock 16. The drive motor 1 at the same time rotates a carriage feed-screw 4 by means of gears 20, 20′, thereby causing carriage 2 to advance in a direction parallel to the lathe axis in synchronism with the rotation of workpiece 3. A tape reader 5 is coupled to the carriage feed-screw 4 by means of gears 21, 21'. Tape reader 5 is similar to tape readers used in teletype systems. When the carriage feed-screw 4 rotates uniformly, a perforated paper tape 6 is pulled through the reading mechanism with an intermittent motion, passing from the pay-out reel 17 onto the take-up reel 18. Each rest position of the intermittently advanced tape corresponds to a definite angular displacement of the screw-feed 4 and hence to predetermined linear advance of the carriage 2 and predetermined rotation of the workpiece 3.

The tape is punched with a definite pattern of holes. Each time the intermittently fed tape comes to rest some of the holes take positions directly under spring-actuated feelers and whenever a feeler is in juxtaposition with a hole an electrical circuit is completed between the metal feelers 8 or 8' in Fig. 2 or 3, and a metallic back-plate 28 closing the circuit through one or more of the signal leads 7. Conversely, the absence of a hole under a particular feeler causes the corresponding signal circuit to remain open by virtue of the insulating properties of the tape. Each time the tape comes to rest, a definite pattern of open and closed circuits appears in the groups of electrical signal leads 7 and such signal pattern or code is controlled entirely by the pattern of holes punched in the tape and by the particular portion of the tape under examination by the feelers.

The perforated tape may, for purposes of illustration, take the form shown in Fig. 2. The tape 6 is provided with longitudinal and transverse rows of holes, the transverse rows representing five-digit binary numbers similar to the tape used in teletype systems employing the Baudot code. A continuous row of holes parallel to the longitudinal rows of holes and labelled S on the drawing is a row of sprocket holes for advancing the tape and the proper indexing of the same in relation to the feelers 8. The control numbers or codes are each in one vertical column crosswise to the length of the tape, one number shown through each sprocket hole. In Fig. 2 these are binary numbers, wherein each perforation in the horizontal row labelled A contributes one unit to the magnitude of the number, each hole in row B contributes 2 units, each hole in a row C contributes 4 units, and so on. The values of numbers shown punched on the tape in Fig. 2 are each written in above the column containing the respective numbers. It will be seen, for example, that the control number comprised of holes in the A, D and E rows, with holes absent in the B and C rows, has a value of 1 plus 8 plus 16, or 25. When this particular control number comes beneath the feelers, the number 25 will then be supplied to the equipment, to indicate that the tool 10 must be displaced 25 units from its reference position.

It will be seen that the only measurement which this particular tape reader is called upon to perform, in order to read the control number, is a measurement of the presence or absence of insulating material between each feeler and the associated back-plate 28. Although each feeler must distinguish between only two different conditions, with a five-digit binary code, thirty-two different control numbers, ranging from 0 to 31 can be correctly distinguished. Using a tape with ten longitudinal rows of holes 1024 different control numbers can be represented so that the position of the tool 10 is specified with precision better than .1 percent and similarly when 15 binary digits are used 32,768 different numbers can be written, corresponding to precision of approximately 30 parts per million. This increase in precision over the required precision of measurement is characteristic of digital storage and reading systems as used in my invention.

Holes punched in the tape do not necessarily represent binary numbers but may indicate numbers in any positional systems of numerical notation, such as the common decimal numbering system.

Fig. 3 shows a form of tape 6' having perforations similar to those used on IBM cards representing numbers written with the base ten. In the particular tape illustrated each sprocket hole in the bottom row S is associated with three punched holes. Each punched hole may take any one of the ten vertical positions marked 0 to 9 and according to its position will actuate one of ten feelers in the group 8'. Each row of feelers therefore reads any one of the decimal digits 0–9 and three such rows, A, B and C, operating simultaneously, specify one of 1,000 different decimal control numbers. In Fig. 3 there will be seen indicated the control numbers 248 and 390 stored on punched tape in this manner.

The digital storages for control numbers may equally take the form of punched cards, such as are commonly employed in computers and tabulating equipment, stacked and examined in proper sequence; or also magnetic tapes or drums, photographic film recordings, electrostatic storage tubes or any of the other digital storages used in computer work may be employed.

Referring to Fig. 1 which represents a form of my invention designed for the tape shown in Fig. 2, each time the tape comes to rest a control number is communicated by means of the electrical signal leads 7 to the digital decoder 11. The decoder 11 generates a voltage $e_i$ whose magnitude is proportional to the value of the control number. This voltage will, in general, be unequal to the voltage $e_0$ derived from a linear potentiometer 12, the slider of which is coupled to the tool holder 9. The voltage difference $e_0 - e_i$ on the control leads 24 will thereupon cause the servomotor 13 to operate and to adjust the position of tool holder 9 and tool 10 by means of a screw 23 and ways 22 until $e_0$ is equal to $e_i$. Since 12 is a linear potentiometer the tool position will be made proportional to the voltages $e_0$ and $e_i$ and in turn proportional to the control number, which constitutes the desired operation of the lathe.

Digital decoders suitable for use in my invention are well known in electrical communications work since they are employed in pulse-code-modulation systems of communication. The operation of one such decoder arranged for binary number code will become evident from Fig. 4 and from the following description. The plurality of leads 7 collectively transmit from the tape reader 5 to the decoder a pattern of signals representing a unique binary control number. Within the decoder the leads 7 are each connected to the actuating coil of one particular relay and said relay closes whenever current flows in the lead. The plurality of relays 30, 31, 32, 33 and 34 are connected to the leads 7 in such order that relay 30 is connected to feeler 8A of the tape reader, relay 31 is connected to feeler 8B, 32 is connected to feeler 8C, and so on, so that the pattern of closures of relays 30–34 reproduces exactly the pattern of holes in the tape. In the terminology of the computer art, the binary control number read from the tape is transmitted in parallel on the leads 7 to the relay bank 30–34. Although, for clarity, only five relays are shown in Fig. 4 it will be clear that additional leads and relays, and binary numbers with more digits, will usually be employed in practice.

The relay contacts are connected as shown to calibrated resistors. Relay 30 is connected to a resistor having greatest value in ohms, relay 31 has exactly half as much resistance in series and so on, with each series resistor exactly half as large in ohmage as its next preceding resistor. It will be seen from Fig. 4 that if we represent the value of the resistor connected to 30 as R, then ½R will be connected to 31, and so on, until ¹⁄₁₆R is connected to 34. The closure of any relay permits current to flow from the voltage source V to ground, through the associated calibrated resistor, and the fixed output resistor $R_0$ and the series resistor $R'$ the other resistors shown. Closure of relay 30 contributes unit current and develops one unit of incremental voltage across $R_0$, but closure of 31 contributes two units and increases the voltage across $R_0$ by two units, and so on, until closure of 34 increases the output voltage across $R_0$ by exactly 16 units. Recalling that the binary number code is so arranged that a tape hole under feeler 8A, resulting in closure of relay 30, contributes one unit to the magnitude of the control number, but a hole under feeler 8B contributes two units, etc., it will be readily seen the total voltage developed across the resistor $R_0$ is then directly proportional to the control number punched on the tape. The decoder of Figure 4 is of known and conventional character per se, and is not the invention of applicant. An analogous system is shown in U.S. patent to Johnson 2,630,552, issued March 3, 1953, and filed April 25, 1949, and is discussed in standard texts.

It will be apparent that by means of resistance ratios other than the fixed ratio two, decoders may be constructed for numbers having other radixes than two, and particularly, decimal decoders may be constructed.

Referring to Fig. 1 it will be seen that as the tape is pulled through the tape reader 5 a succession of binary numbers is examined. If the servomotor 13 were to remain inoperative the tool would trace out a helical path in relation to the workpiece 3 and a cylinder would be cut. Now, each particular sprocket hole in the row labelled S, in Fig. 2, passes through the feeler mechanism in synchronism with the tool motion over one definite small section of the aforementioned helical path. It will be clear that in response to signals read from the tape indicating the control number, the servomotor 13 will operate, if necessary, to position the tool 10 the number of units from its reference position determined by the control number, whereby the voltage $e_0$, which measures the tool position, will just match the voltage $e_1$ which indicates the value of the control number. By punching at each particular sprocket hole a suitable control number, it may be arranged to fabricate the particular shape of workpiece desired since the radius of the helix described by the tool will thereby be varied as required.

It is desirable that the same voltage source E which powers the decoder 11 serve also for the potentiometer 12 thereby forming a bridge circuit. When the decoder of Fig. 4 is used the bridge will be more easily balanced if resistor $R''$ is inserted as shown in Fig. 1, to compensate for the series resistor $R'$ shown in Fig. 4.

In the arrangement shown in Fig. 1 and described above the accuracy with which the workpiece 3 can be machined is limited by whatever small errors and irregularities exist in the linear potentiometer 12 and by whatever small errors exist in the decoder 11.

Figure 5:
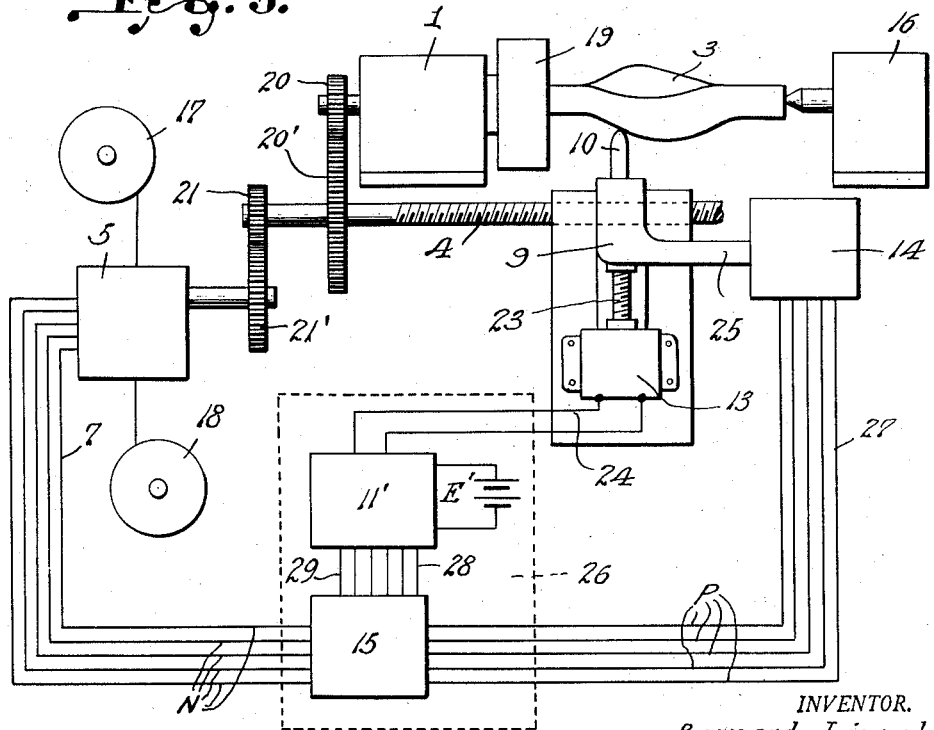
Fig. 5 is a different arrangement in accordance with which the lathe of Fig. 1 can be operated with greater precision and accuracy.

When greatest accuracy is required I therefore prefer the arrangement shown in Fig. 5 which includes what is known as a digital servo. Comparison of Fig. 5 with Fig. 1 indicates that the potentiometer 12, the resistor $R''$, the voltage source E, and the decoder 11 are omitted from Fig. 5 and are replaced by a digital encoder 14 and a comparator-corrector 26, interconnected by a group of leads 27 similar to the leads 7, which are as in Fig. 1 but which here connect the tape reader 5 to 26.

The digital encoder 14 measures linear displacements of the tool 10, a function which is performed by the potentiometer 12 of Fig. 1. Encoder 14 is shown coupled to the tool holder 9 by means of the arm 25 but it may equally be arranged to measure angular displacement of the screw 23, or it may be coupled to a guage or feeler which rests on the work so as to measure the depth of the cut made by the tool 10. As will be explained below, the encoder 14 can be constructed to be more accurate and precise than a potentiometer and it has the additional advantage of a digital output in place of the voltage $e_0$ of Fig. 1. This output is labeled P in Fig. 5 and is transmitted to 26 on the leads 27 by means of the same code or language wherein the control number obtained from the tape reader 5 is transmitted to 26. It will be seen that the control number from the tape indicates the desired position of the tool 10 and P represents the actual measured position of 10.

In contradistinction to the first described arrangement in Fig. 1 the control number is not converted to a voltage in a decoder but is compared digitally with the number P by means of equipment termed herein a comparator-corrector and shown within the dotted outline in Fig. 5, designated 26. The comparator-corrector 26 is constructed so that unless P is identical with the control number, electrical energy is supplied to the servomotor 13 by means of the control leads 24 phased so that the servomotor rotates in a manner which causes P to approach the control number in value and ultimately become equal, whereupon the motor 13 is stopped by removal of the correction signal from 24 and the tool 10 is thereby locked in the required position.

The comparator-corrector 26 may take several forms. For example it may operate in a manner well known in the art and described by the Staff of Engineering Research Associates, Inc. on pp. 394 and 395 of their book entitled "High-Speed Computing Devices." In this arrangement, only the most significant digit of the control number is first compared with the digit of P of equal order, and the motor is then operated so as to vary P until the compared digits match; then the next most significant digits are compared and matched, and so on, until the entire number P is the same as the control number.

I prefer a form of corrector 26 which is disclosed in detail in a co-pending patent application, Serial No. 219,101, filed April 3, 1951, now U.S. Patent No. 2,685,-054 entitled "Data Transmission System," filed in the name of Millard M. Brenner et al. and assigned to the Government of the United States, now U.S. Patent No. 2,685,054, and which will therefore be described herein only briefly.

The preferred arrangement is shown in block form in Fig. 5. Calling the position number N an electronic digital subtractor 15 of conventional design receives the positive numbers N and P and computes the difference $N-P$. The difference or correction $N-P$ is then transmitted to a decoder 11' by means of signals on the leads 28 and a code or language similar to that used for N and P. Although the numbers N and P may be restricted to positive values by suitable choice of the reference position from which 10 is measured, the difference $N-P$ may equally be positive or negative. It is common practice in digital computing machines to represent a negative number by means of its complement and to indicate that the number is negative by means of a signal on an extra lead provided for that purpose. Therefore, the group 28, Fig. 5, is shown having one more lead than the groups 7 and 27, and the extra lead 29 is termed a sign lead. The decoder 11' differs from 11 of Fig. 1 only in that provision must be made for negative numbers, as represented by complements and by signals on a sign lead in the customary fashion. Most of the various circuits suitable for the decoder 11 may be modified to function in the required manner. For example, the five digit binary decoder shown in Fig. 1 may be modified by the addition of the parts shown connected by dotted lines. An extra relay 35 is connected to the sign lead 29 in series with a calibrated resistor of value $\frac{1}{32}R$, but connected to a reversed source of voltage $-V$. When used with a binary number code wherein current flow in 29 signifies a negative number and current flow through any of the remaining leads 7 or 28 signifies a 1, rather than a 0, this circuit will then function in the required manner, reversing the polarity of the correction transmitted on the leads 24 to the servomotor 13 whenever the algebraic sign of $N-P$ changes. The combination of V and $-V$ in Fig. 4 is schematically equivalent to E of Fig. 5.

Referring to Fig. 5, whenever N—P is other than zero, the decoder 11' delivers to the control leads 24 a fraction of the fixed voltage E proportional to N—P and so phased, in accordance with the algebraic sign of N—P, that the servomotor 13 rotates in a direction calculated to make P approach and ultimately to become the same as N. The entire readjustment of the position of the tool 10 subsequent to each new value of N sampled by the tape reader 5 may be made to occur in an interval of time small compared to the interval between samples. Furthermore, by proper adjustment of the damping of the digital servo, controllable by proper adjustment of the voltage source E, overshoot may be eliminated if desired, thereby giving a smoother finish to the work than will result if the tool 10 is permitted to overshoot and to cut small depressions in the surface of the workpiece.

It is not necessary that the decoder 11' be accurate like the decoder 11 of Fig. 1. A large tolerance may be permitted in the decoding accuracy of 11', inasmuch as the tool 10 is brought to rest and held at its required displacement only when the decoder input N—P and the electrical output of the decoder are both zero.

An improved form of the special decoder 11' is described in a co-pending patent application, Serial No. 219,104, filed April 3, 1951, now U.S. Patent No. 2,685,084, entitled "Digital Decoder," filed in the name of Bernard Lippel et al., and assigned to the Government of the United States, now U.S. Patent No. 2,685,084. The same improved decoder may be used, in simplified form, with the arrangement of Fig. 1 to increase the accuracy of decoding and to generate greater fractions of the voltage E than is possible with the circuit of Fig. 1.

Although the voltage sources E, V and —V of Figs. 1, 4 and 5 are shown, for simplicity, as batteries it is understood that these may be any suitable voltage sources, A.-C. or D.-C., whichever is required by the particular type of servomotor employed.

Referring to the digital encoder 14 of Fig. 5, the general operation of one form of this apparatus may be understood by imagining a tape like that of Fig. 2, but perforated with a continuous succession of numbers arranged in numerical order; in other words, as we traverse the tape, say from left to right, the numbers are each one unit greater than its left-hand neighbor. Imagine now that the tape moves back and forth with reference to a set of stationary metallic feelers similar to 8 of Fig. 2, which make contact with a stationary backplate, similar to 28, so as to complete certain circuits and to transmit the number P on the leads 27 which are connected to the feelers. It is necessary that the distance which the tape moves shall be accurately proportioned to the motion of the tool 10, whereupon the numbers read by the feelers will be proportional to the displacement of the tool 10 from a reference position indicated by the number zero.

In practice, the perforated tape encoder described above cannot be constructed to be as accurate as the present invention requires, but the principle of a code pattern representing a continuous succession of numbers, moved in relation to a fixed reading head is employed in encoders which measure mechanical displacement with very high precision and accuracy. In particular the perforated tape may be replaced by a glass plate bearing a continuous sequence of numbers in terms of transparent and opaque areas and the metallic feelers may correspondingly be replaced by photocells operated in conjunction with an optical system which preferably includes a slit. Such optical patterns have been constructed with microscopic detail so as to permit minute displacements to be measured and read by the photocells. The code pattern plate may be fastened to the arm 25 in Fig. 5 and the photocell system may then be fastened to the lathe bed, so that the encoder functions as a very accurate micrometer with digital output.

Complete details of the construction and operation of an optical encoder, which can be applied to the measurement either of linear displacement, as of the tool-holder 9, or angular displacement, as of the screw 23, with added safeguards against improper or ambiguous readings, are given in a co-pending patent application, Serial No. 219,103, filed April 3, 1951, now U.S. Patent No. 2,679,644, entitled "Data Encoder System," filed in the name of Bernard Lippel et al., and assigned to the Government of the United States, now U.S. Patent No. 2,679,644.

The foregoing description and drawings refer to a simple system constructed about a lathe and utilize electrical devices and networks in the operation of the systems described. It will be understood, however, that my invention applies equally to all such other types of machine tools as may now be controlled automatically by patterns or models in accordance with prior art. Furthermore, electrical circuits, networks and devices are in no ways essential to the operation of my invention in its various forms, although they may be in some cases preferable. A completely pneumatic system, for example, may serve to read a digital pattern from perforated tape; the resultant signals may be transmitted in tubings to a pneumatic decoder, comprising a system of pressure-actuated valves which control the flow of air through calibrated capillaries or orifices, to generate a pressure signal proportional to the number N; and finally the pressure signal may position the cutting tool in the required manner through the action of a pneumatic servo system, the principles of which are well known. Such a pneumatic system provides a complete pneumatic analog for the electrical networks of Fig. 1, and a machine tool so controlled has all of the peculier advantages of the form of my invention shown in Fig. 1. In a like manner, pneumatic analogs can be provided for all or part of the electrical networks of Fig. 5; and other analogs may be used in my invention without departing from its scope or character.

It will be evident to persons familiar with modern techniques of electrical communication that the arrangements of Figs. 1 and 5 may each be modified and adapted for operation of the machine tool remote from the tape 6 and the tape-reader 5. For example, with the coupling gears 21, 21' omitted, the tape reader 5 may be remotely operated from an independent motor. The successive values of the control number N may be transmitted to the machine tool in the manner of teletype or PCM signals, and the framing or synchronizing signals normally provided may at the same time be used to synchronize the drive motor 1 with the remotely located tape reader 5 in accordance with well-known servo methods for speed control.

It will furthermore be evident that in any arrangement which omits the coupling gears 21, 21' and provides means for synchronization of the drive motor 1 with an independently driven tape-reader 5, a plurality of identical machine tools may be operated simultaneously from one digital pattern.

For remote operation of a machine tool, a preferred method, in many cases is to first prepare in the vicinity of the machine tool a complete new tape pattern, which is a duplicate of the remote master pattern, using a teletype re-perforator or some similar device to make the required duplication at a distance, and then to use the duplicate tape in the manner shown in Fig. 1 or Fig. 5.

The various cases and examples described above indicate the versatility of my invention. Other embodiments which do not depart from its scope or character will doubtless suggest themselves to persons skilled in the art as well as other uses to which my invention may be applied and other advantages thereof.

Having thus described my invention, I claim:

1. An automatically controlled machine element comprising a control data storage means having stored therein a plurality of sets of coded digital indicia arranged in order of read-out, each set representing an arbitrary desired distance of a movable element of said element of said machine from said datum common to all said sets, each of said indicia including a plurality of code elements, indicia including the same number of code elements having the same arrangement representing the same multiple digit control number, each control number representing a predetermined desired instantaneous distance, read-out means for converting said sets of coded indicia sequentially and successively and only in a predetermined order to digitally coded electrical signals representative of said control numbers, means for synchronizing presentation of said coded indicia to said means for converting with movement of said element of said machine parallel with said datum, means for generating a second digitally coded electrical signal having a magnitude representative of an instantaneous actual distance between said element and said datum, comparator means for generating a third electrical signal having an algebraic sign and a magnitude representative respectively of the algebraic sign and magnitude of the digital difference between said first and second digitally coded electrical signals, and reversible motive means actuatable in one sense in response to signal of one algebraic sign and in the opposite sense in response to signal of opposite algebraic sign, and responsive to said third electrical signal in respect to both algebraic sign and magnitude for varying the distance between said element and said datum in such sense and to such extent as to reduce said third electrical signal to zero.

2. An automatically controlled machine element comprising a control data storage means having stored therein a plurality of sets of coded digital indicia arranged in order of read-out, each set representing an arbitrary desired distance of a movable element of said element of said machine from a datum common to all said sets, each of said indicia including a plurality of code elements, indicia including the same number of code elements having the same arrangement representing the same multiple digit control number, each control number representing a predetermined desired instantaneous distance, means for converting said sets of coded indicia sequentially and successively in a predetermined order to digitally coded electrical signals representative of said control numbers, means for synchronizing presentation of said coded indicia to said means for converting with movement of an element of said machine parallel with said datum, means for generating a second quantized electrical signal having a magnitude representative of an instantaneous actual distance between said element and said datum, comparator means for generating a third electrical signal having an algebraic sign and a magnitude representative respectively of the algebraic sign and magnitude of the difference between said first and second electrical signals, and reversible motive means actuatable in one sense in response to signal of one algebraic sign and in the opposite sense in response to signal of opposite algebraic sign, and responsive to said third electrical signal in respect to both algebraic sign and magnitude for varying the distance between said element and said datum in such sense and to such extent as to reduce said third electrical signal substantially to zero.

3. An automatically controlled machine element, comprising a control data storage means, storing a plurality of sequentially readable sets of coded digital indicia, each set representing a location of said element measured with respect to a datum common to all said sets of indicia, means for converting said sets of coded digital indicia in sequence to corresponding sets of first coded digital signals, means for generating second coded digital signals representative continuously of the actual result of an operation by said element of said machine, a digital comparator corrector responsive to said first and second coded digital signals for deriving signals for deriving error signals having magnitude and algebraic sign representative of the algebraic difference between said first and second coded digital signals, motor means actuatable in opposite senses in accordance with algebraic sign of said error signals for varying the difference between the location of said element and said datum and means for supplying said error signals to said motor means for controlling said motor means in such senses as to tend to minimize said error signals, wherein said algebraic sign is positive or negative according as one or the other of said digital signals represents the larger number.

4. An automatically controlled machine element, comprising a control data storage means storing a plurality of sequentially readable sets of coded digital indicia representing each a desired arbitrary numerical distance of said element of said machine from a datum common to all said sets of indicia, said indicia being arranged in order of read-out means for converting said sets of coded digital indicia in sequence to corresponding sets of first coded digital signals each set representative of one of said numerical distances, means for generating a second quantized signal representative continuously of actual numerical distance of said element from said datum, a comparator corrector responsive to said first and second signals for deriving an error signal having a magnitude and algebraic sign continually representative of the algebraic difference between the numerical distances represented by said first and second signals, motor means actuatable in opposite senses in accordance with alegbraic sign of said error signal for varying the distance between said element and said datum, and means for supplying said error signal to said motor means for controlling said motor means in such sense as to reduce said error signal substantially to zero, wherein said algebraic sign is positive or negative according as one or the other of said signals represents the larger number.

5. The combination in accordance with claim 3 wherein said datum is fixed and said element is movable.

6. The combination in accordance with claim 4 wherein said datum is fixed and said element is movable.

7. A system for automatically controlling the displacements between a first element and a second element, one of which is movable relative to the other, comprising a record source of first digitally coded signals each representative of desired numerical displacements between said elements and of a read-out order, means for reading out said coded signals from said second source in said read-out order, device for generating a second digitally coded signal representative of actual numerical displacements between said elements, means for converting said first and second digitally coded signals as read-out and as generated to error signals representative in both magnitudes and algebraic signs of the signs and magnitudes of the differences between said desired distance and said actual displacements, and reversible motor means responsive to said error signals for reducing said error signals substantially to zero by varying said actual displacements in directions determined by said signs until said actual displacements correspond substantially with said desired displacements, wherein said differences have alternative algebraic signs according as said desired displacements are greater or smaller than said actual distance.

8. A system for automatically controlling the distance between a first element and a second element, one of which is movable relative to the other, comprising a prerecorded source of a first set of digitally coded signals representative of a desired numerical distance between said elements, a device for generating a second set of quantized signals representative of actual numerical distance between said elements, means for converting said first and second signals to an error signal representative in both magnitude and algebraic sign of the sign and magnitude of the difference between said desired distance and said actual distance, and reversible motor means responsive to said error signal for reducing said error signal substantially to zero by varying said actual distance in a sense determined by said sign until said actual distance corresponds substantially with said desired distance, wherein said difference has alternative algebraic signs according as said desired distance is greater or smaller than said actual distance.

9. In combination in a machine tool, a control data storage means, said control data being in the form of sequentially available discrete sets of first digitally coded indicia each set representing a desired dimension of a structure subject to machining by said machine tool, means for converting each of said discrete sets of coded indicia to a set of first digitally coded signals representative of said desired dimension, means for generating sets of second digitally coded signals each set representative of an actual dimension of said structure during machining by said machine tool, means for generating error signals in response to subtractive combination of said sets of first and second digitally coded signals alternatively positive or negative according as one or the other of said sets represents a greater dimension, and means responsive to said error signal for continuously controlling said machine tool in such sense and amount as to tend to render said first and second digitally coded signals substantially equal in magnitude.

10. In combination in a machine tool, a control data storage means, said control data being in the form of sequentially available discrete sets of first digitally coded indicia each representing a desired dimension of a structure subject to machining by said machine tool, means for converting each of said discrete sets of coded indicia to a set of first digitally coded signals representative of said desired dimension, means for generating second quantized signals each representative of an actual dimension of said structure during machining by said machine tool, means for generating alternatively positive or negative error signals in response to subtractive combination of said first and second signals according as one or the other of said signals represents a greater dimension, and means responsive to said error signal for continuously controlling said machine tool in such sense and amount as to tend to render said first and second signals substantially equal in magnitude.

References Cited in the file of this patent

UNITED STATES PATENTS

| | | |
|---|---|---|
| 2,029,335 | Oberhoffken et al. | Feb. 4, 1936 |
| 2,116,593 | Bouvier et al. | May 10, 1938 |
| 2,142,882 | Benzon et al. | Jan. 3, 1939 |
| 2,358,746 | Tandler et al. | Sept. 19, 1944 |
| 2,365,365 | Trinkle | Dec. 19, 1944 |
| 2,484,968 | Sponaugle | Oct. 18, 1949 |
| 2,537,427 | Seid et al. | Jan. 9, 1951 |
| 2,628,539 | Neergaard | Feb. 17, 1953 |
| 2,685,054 | Brenner et al. | July 27, 1954 |
| 2,690,532 | Johnson | Sept. 28, 1954 |
| 2,710,934 | Senn | June 14, 1955 |

FOREIGN PATENTS

| | | |
|---|---|---|
| 534,864 | Germany | Oct. 5, 1931 |
| 356,326 | Great Britain | Sept. 10, 1937 |